United States Patent
Yu et al.

(10) Patent No.: US 7,506,391 B2
(45) Date of Patent: Mar. 24, 2009

(54) METHOD FOR PRODUCING LOW SHRINKAGE POLYAMIDE FIBER AND UNCOATED FABRIC FOR AIRBAGS MADE OF THE SAME

(75) Inventors: Je-An Yu, Seoul (KR); Chang-Hwan Lee, Seoul (KR)

(73) Assignee: Hyosung Corporation, Anyang-si (KR)

( * ) Notice: Subject to any disclaimer, the term of this patent is extended or adjusted under 35 U.S.C. 154(b) by 539 days.

(21) Appl. No.: 11/290,425

(22) Filed: Dec. 1, 2005

(65) Prior Publication Data

US 2006/0083874 A1    Apr. 20, 2006

Related U.S. Application Data

(62) Division of application No. 10/720,260, filed on Nov. 25, 2003, now abandoned.

(30) Foreign Application Priority Data

Oct. 22, 2003   (KR)   .................. 10-2003-0073662
Oct. 22, 2003   (KR)   .................. 10-2003-0073664

(51) Int. Cl.
    *D06B 3/10* (2006.01)
(52) U.S. Cl. ......................... 8/151; 428/36.1
(58) Field of Classification Search ............ 8/151, 8/149.3; 139/291 R; 428/36.1
    See application file for complete search history.

(56) References Cited

U.S. PATENT DOCUMENTS 3,153,838 A * 10/1964 Pinson, Jr. ............... 442/184

| | | | |
|---|---|---|---|
| 4,496,630 A | | 1/1985 | Kurita et al. |
| 5,073,418 A | * | 12/1991 | Thornton et al. ........... 428/34.9 |
| 5,477,890 A | | 12/1995 | Krummheuer et al. |
| 5,612,124 A | | 3/1997 | Krummheuer et al. |
| 5,693,392 A | * | 12/1997 | Bergen et al. ............... 428/36.1 |
| 5,806,155 A | * | 9/1998 | Malaney et al. ................ 28/167 |
| 5,952,250 A | * | 9/1999 | Kim et al. .................... 442/203 |
| 6,182,709 B1 | * | 2/2001 | Konishi et al. .............. 139/389 |

FOREIGN PATENT DOCUMENTS

| | | |
|---|---|---|
| EP | 0416483 | 3/1991 |
| EP | 0 423 808 B1 | 4/1991 |
| EP | 0436950 | 7/1991 |
| EP | 0 501 295 A1 | 9/1992 |
| JP | 10-41438 A | 2/1989 |
| JP | 04-201650 A | 7/1992 |
| JP | 6-248508 A | 9/1994 |
| JP | 7-252740 A | 10/1995 |
| JP | 07-252740 A | 10/1995 |
| JP | 08-002359 A | 1/1996 |
| JP | 9-105047 A | 4/1997 |
| JP | 9-291465 A | 11/1997 |
| JP | 2950954 | 7/1999 |
| JP | 2002-146647 A | 5/2002 |
| JP | 2002-266161 A | 9/2002 |

* cited by examiner

*Primary Examiner*—Frankie L Stinson
(74) *Attorney, Agent, or Firm*—Sughrue Mion, PLLC

(57) ABSTRACT

The present invention relates to a low shrinkage polyamide fiber suitable for use as a yam of a fabric for airbags and an uncoated fabric for airbags produced using the same. The fabric produced using the low shrinkage polyamide fiber of the present invention has high tensile strength and tear strength, and excellent quality, and thus, is useful as a fabric for airbags.

5 Claims, 1 Drawing Sheet

METHOD FOR PRODUCING LOW SHRINKAGE POLYAMIDE FIBER AND UNCOATED FABRIC FOR AIRBAGS MADE OF THE SAME

This is a divisional of application Ser. No. 10/720,260 filed Nov. 25, 2003 now abandoned. The entire disclosure of the prior application, application Ser. No. 10/720,260 is hereby incorporated by reference.

BACKGROUND OF THE INVENTION

1. Field of the Invention

The present invention relates to a low shrinkage polyamide fiber suitable for use as a yarn of a fabric for airbags, and an uncoated fabric for airbags produced using the same. The uncoated fabric for airbags is produced by a method comprising the steps of: (A) weaving a low shrinkage polyamide fiber having a dry heat shrinkage of 3-6% (190° C. for 15 minutes) into a grey fabric for airbags; (B) heat-shrinking the grey fabric by successively passing it through 3-10 aqueous baths, the temperature of each of which is 5-20° C. higher than that of the preceding aqueous bath; (C) additionally heat-shrinking the fabric from the aqueous baths by passing it through a steam heater; and (D) drying the fabric from the steam heater by passing it through a hot air drier.

The fabric produced using the low shrinkage polyamide fiber of the present invention has high tensile strength and tear strength, and excellent quality, and thus, is useful as a fabric for airbags.

2. Background of the Related Art

Recently, airbags become necessary to secure the safety of passengers and thus their mounting in vehicles is being gradually increased.

The requirements for the air bags include low permeability to ensure their smooth deployment in the event of a collision, high tenacity to prevent the damage and bursting of the airbags themselves, and flexibility to prevent the abrasion of the passenger's face upon their deployment, and the like. Recently, improvements in foldability and packability of airbag fabrics themselves, and a reduction in costs thereof, also become important factors.

Airbag fabrics are broadly divided into coated fabrics whose surface was coated with resin after weaving, and uncoated fabrics which are used intact after weaving. In view of the maintenance of low permeability as described above, the uncoated fabrics are generally advantageous for use in the airbags.

There have been many technologies to realize airbags which have excellent foldability and are packed at reduced volume without deteriorating the high tenacity and low permeability suitable for the airbags. For this purpose, for example, Japanese patent laid-open publication No. Heisei 1-41438 discloses producing an airbag fabric using a yarn strand made of fibers with a tenacity of at least 8.5 g/d and a monofilament fineness of less than 3 deniers. Although this publication discloses nothing regarding the difference between coated fabrics and uncoated fabrics, the airbag fabric disclosed in this publication are essentially a coated fabric whose surface was coated with elastomer, such as chloroprene rubber. If the technology disclosed in this publication is applied to the uncoated fabric, the tenacity and packability of the fabric could be surely satisfied, but the maintenance of low air permeability could not be sufficiently satisfied.

Furthermore, Japanese patent laid-open publication No. Heisei 4-201650 discloses a technology of producing an airbag fabric with excellent tenacity and foldability, in which the airbag fabric is produced using a polyamide multifilament made of a plurality of monofilaments each having a deformed cross-section with a deformation degree of 1.5-7.0, and a monofilament fineness of 1.0-12 deniers. However, if the technology disclosed in this publication is applied to the coated fabrics, the requirements for airbags will be satisfied, but it is applied to the uncoated fabrics, air permeability, particularly at seams, will remain as a problem to be solved.

Technologies regarding the uncoated fabrics include a method described in Japanese patent laid-open publication No. Heisei 7-252740. This publication discloses that flat cross section yarns having a flat ratio of at least 1.5 are used to produce an uncoated airbag fabric excellent in low permeability, foldability and packability. However, the uncoated airbag fabric has an air permeability of more than 0.3 cc/cm$^2$/sec under low pressure (124 Pa), and thus, cannot sufficiently meet the recent requirement of low permeability.

Meanwhile, to meet the US standard FMVSS208 revised in 2000, making an inflator dual is being examined. Since this inflator has two-stage deployment, gas output at the second stage is greater than the output of the prior inflator. For this reason, there are required an air permeability lower than the prior art even under high pressure, and also a reduction in slippage between a sewing yarn and a fabric at the seams of airbags (hereinafter, referred to as the seam slippage).

From this point of view, uncoated fabrics produced using yarns with a total fineness of 300-400 dtex as disclosed in Japanese patent No. 2950954 hardly seem to have a sufficiently low seam slippage. Furthermore, Japanese patent laid-open publication No. Heisei 8-2359 discloses airbag fabrics having a weft/warp cover factor of 900-1400, which are characterized by a specified amount of oil remaining therein and specified slippage resistance. However, the airbag fabrics disclosed in this publication cannot also seem to be sufficient to meet the seam slippage.

U.S. Pat. No. 5,073,418 discloses a method where a cloth is produced using a yarn of less than 500 deniers and then calendered to reduce its permeability, and thus, to exhibit the effect of an improvement in its air tightness. However, this method is disadvantageous in that the tear strength of the cloth is reduced.

European patent publication No. 416483 discloses a heat-shrinkable or heat-shrunk, uncoated fabric for the production of airbags, in which the fabric is made of a synthetic filament yarn having a substantially symmetrical structure and a fineness of 300-400 dtex. However, a method for producing the fabric disclosed in this publication has a problem in that the tenacity of the synthetic filament yarn is rapidly lowered during a heat shrinkage process to reduce the tear strength of the fabric.

European patent publication No. 436950 discloses a method for the production of an industrial fabric which has a dense texture and does not need to be coated. In the disclosed method, the fabric made of a polyamide filament yarn having a hot-air shrinkage of 6-15% at 160° C. and at least substantially symmetrical structure is treated in an aqueous bath at a temperature of 60-140° C. However, this method has a problem in that the heat shrinkage of the synthetic filament yarn rapidly occurs in the aqueous bath of high temperature so that the quality of the fabric is lowered and the tear strength of the cloth is reduced.

SUMMARY OF THE INVENTION

Accordingly, the present invention has been made to solve the above-mentioned problems occurring in the prior art, and an object of the present invention is to provide a uncoated fabric for airbags, which is produced by a method comprising the steps of:

(A) weaving a low shrinkage polyamide fiber having a dry heat shrinkage of 3-6% (at 190° C. for 15 minutes) into a grey fabric for airbags;

(B) heat-shrinking the grey fabric by successively passing it through 3-10 aqueous baths, the temperature of each of which is 5-20° C. higher than that of the preceding aqueous bath;

(C) additionally heat-shrinking the fabric from the aqueous baths by passing it through a steam heater; and (D) drying the fabric from the steam heater by passing it through a hot air drier.

According to the present invention, the grey fabric for airbags is produced using the low shrinkage polyamide fiber, which is obtained by controlling the drawn yarn to have a more stable crystalline structure and has a dry heat shrinkage of 3-6% (at 190° C. for 15 minutes). Thus, another object of the present invention is to provide the uncoated fabric for airbags, which has high tensile strength and tear strength, and excellent quality.

A low shrinkage polyamide fiber according to the present invention is preferably produced by a method comprising the steps of:

(A) melt-extruding a polyhexamethyleneadipamide polymer through a spinneret at a temperature of 270-320° C., the polymer containing hexamethyleneadipamide repeat units at the amount of at least 85 mol % and having a relative viscosity of 2.5-4.0;

(B) quenching and solidifying the extruded polymer below the spinneret by means of cooling gas to form an undrawn yarn, and taking-up the undrawn yarn at a rate of 200-1,000 m/min; and (C) subjecting the undrawn yarn to multi-stage drawing to a total draw ratio of at least 4.0, heat treatment and relaxation to form a drawn yarn, and winding the drawn yarn.

The polyamide fiber of the present invention satisfies the following physical properties:

(1) a dry heat shrinkage of 3-6% (at 190° C. for 15 minutes), (2) a tenacity of at least 9.0 g/d, (3) an elongation of at least 20%, (4) a birefringence of less than 0.065, and (5) a fineness of 200-1,000 deniers In the present invention, the total fineness of the polymaide fiber is preferably 630 deniers.

In the present invention, the total fineness of the polymaide fiber is preferably 420 deniers.

In the present invention, the total fineness of the polymaide fiber is preferably 210 deniers.

In the step (C) of the method for the production of the low shrinkage polyamide fiber of the present invention, the relaxation temperature of the yarn is preferably 200-260° C. and the percent relaxation of the yarn is 2-7%.

In the present invention, the polyamide fiber preferably has a monofilament fineness of 3-7 deniers.

A polyhexamethyleneadipamide polymer used in the present invention contains at least 85 mol % of hexamethylene adipamide repeat units, and preferably consists only of the hexamethylene adipamide repeat units.

In the present invention, polyamide homopolymer and copolymer may be used in a substitute for the polyhexamethyleneadipamide polymer. Such polyamides are mainly aliphatic. Nylon polymers, such as poly(hexamethylene adipamide) (nylon 66), poly($\epsilon$-caproamide) (nylon 6) and a copolymer thereof, etc., can be preferably used. Nylon 66 is most preferably used. Other nylon polymers which can be advantageously used include nylon 12, nylon 46, nylon 6/10, nylon 6/12 and the like.

For an improvement in thermal stability, the polyhexamethyleneadipamide polymer used in the present invention is preferably added in such an amount that the amount of copper metal remaining in the final polymer is 20-50 ppm. If the amount of copper metal remaining in the final polymer is less than 20 ppm, the thermal stability of the polymer upon spinning will be reduced to cause the thermal decomposition of the polymer. On the other hand, it exceeds 50 ppm, excessive copper metals will act as a foreign substance to cause undesirable effects upon spinning.

DETAILED DESCRIPTION OF THE PREFERRED EMBODIMENT

Figure 1:
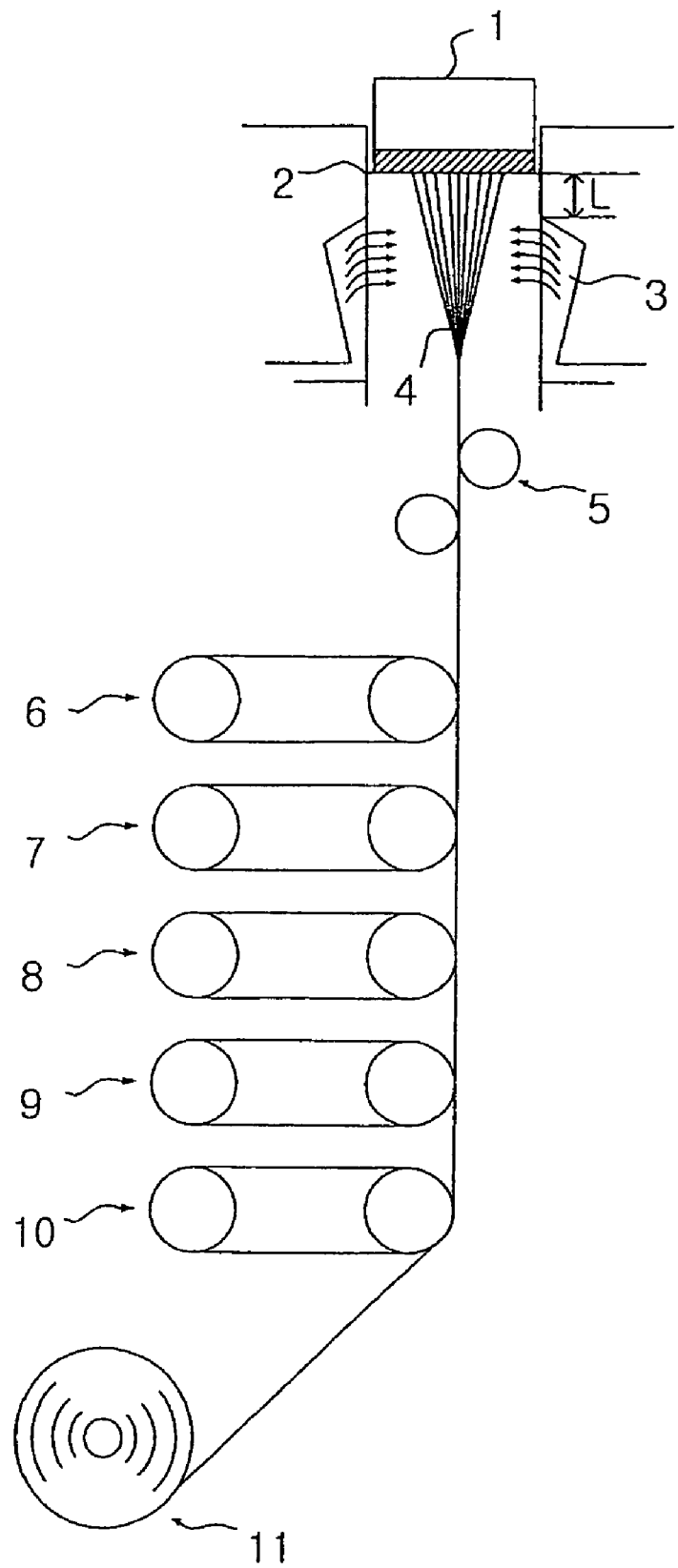
FIG. 1 schematically illustrates a process for the production of a low shrinkage polyamide fiber according to the present invention.

The polyhexamethyleneadipamide polymer is spun into a fiber according to the producing method of the present invention. FIG. 1 schematically shows a producing process of a low shrinkage polyamide fiber according to one preferred embodiment of the present invention.

In the step (A) of the method for the production of the low shrinkage polyamide fiber of the present invention, the polyhexamethyleneadipamide polymer is melt-spun through a spinning pack 1 and nozzles 2 at a spinning draft ratio (the linear velocity on a first winding roller/the linear velocity in nozzles) of 20-200 at a relatively low temperature of 270-320° C. to prevent its viscosity decrease caused by its thermal decomposition. When the spinning draft ratio is below 20, the uniformity of the filament cross-section will be reduced to remarkably deteriorate the drawing workability of the polymer, whereas if it exceeds 200, filament breakage occurs during spinning and thus it will be difficult to produce a normal cloth.

Furthermore, it is critical to the present invention that the residual time of the polymer in the spinning pack is adjusted to 3-30 seconds. If the residual time in the spinning pack is shorter than 3 seconds, the filtration of foreign substances will be insufficient, whereas if it is longer than 30 seconds, an excessive increase in pressure of the spinning pack will occur to cause the excessive thermal decomposition of the polymer.

Moreover, in the present invention, the length/diameter (L/D) ratio of an extender screw preferably ranges from 10 to 40. If the L/D of the screw is below 10, it will be difficult to achieve the uniform melting of the polymer, whereas if it exceeds 40, excessive shear stress will occur to cause an excessive reduction in molecular weight of the polymer.

In the step (B) of the method, the melt-spun yarn 4 formed in the step (A) is quenched and solidified by passing it through a cooling zone 3.

In the cooling zone 3, a quenching method which is selected from open quenching, circular closed quenching, radial outflow quenching and the like depending on a blowing method of cooling air can be applied. The open quenching method is preferably used.

Then, the spun yarn 4, which was solidified by passing through the cooling zone 3, may be oiled to 0.5-10% by an oil-feeding roller 5.

In the step (C) of the method, the undrawn yarn is preferably taken up at a rate of 200-1,000 m/minute.

In the step (D) of the method, the yarn passed through the first drawing roller 6 is passed through a series of drawing rollers 7, 8, 9 and 10 by a multistage drawing process so that it is drawn to a total draw ratio of at least 4.0, and preferably 4.5-6.5, to form a final drawn yarn 11.

A technical subject matter of the method for the production of the low shrinkage polyamide fiber of the present invention is that the dry-heat shrinkage of the polyamide fiber is 3-6% (at 190° C. for 15 minutes). The dry-heat shrinkage of the fiber depends on temperatures where the shrinkage measurement is conducted. The dry-heat shrinkage measured at 190° C. for 15 minutes is 1% higher than that measured at 160° for 30 minutes. Namely, the shrinkage of the low shrinkage fiber produced according to the present invention is about 2-5% at 160° for 30 minutes. The low shrinkage of such a fiber is achieved by stabilizing the crystalline structure of the drawn yarn in a heat treatment process after a two-stage drawing process. The two-stage drawing process of the present invention consists of a first stage drawing process being conducted at low temperature and a high draw ratio, and a second stage drawing process being conducted at high temperature and a relatively low draw ratio.

In the first stage drawing process, the orientation crystallization of the yarn mainly occurs. The crystal formed by the orientation is a factor determining the thermal shrinkage of a fabric in a scouring process. The first stage drawing process of the present invention is preferably conducted at a drawing temperature of 20-50° C. and a drawing ratio of at least 3.0. If the drawing temperature is lower than 20° C., it will be necessary to dispose an additional cooling unit on the drawing rollers in order to maintain the drawing temperature at 20° C. or below, and thus, a disadvantage in view of economical efficiency will be caused. If the drawing temperature is higher than 50° C., the thermal crystallization of the yarn will occur to cause undesirable effects. Furthermore, if the drawing ratio is lower than 3.0, sufficient orientation crystallization of the yarn will hardly occur.

In the second stage drawing process of the present invention, the thermal crystallization of the yarn occurs due to high-temperature heat. The crystals formed by high-temperature heat have an effect on the heat-shrinkage of a fabric during a drying process in a hot-air drier after scouring of the fabric. The second stage drawing process of the present invention is preferably performed at a drawing temperature of 200-250° C. and a draw ratio of less than 2.0. If the drawing temperature is lower than 200° C., the thermal crystallization of the yarn will be insufficient, whereas if it exceeds 250° C., the damage of the yarn will be induced to cause undesirable effects. Furthermore, if the draw ratio is above 2.0, the elongation of the yarn will be rapidly reduced.

Another technical subject matter of the method for the production of the low shrinkage polyamide fiber of the present invention is that the relaxation temperature and percent relaxation of the yarn are adjusted to 200-260° C. and 2-7%, respectively. If the relaxation temperature of the yarn is lower than 200° C., it will be difficult to sufficiently stabilize the crystalline structure of the yarn by heat, whereas if it is higher than 260° C., the damage of the yarn will be caused due to heat to induce undesirable effects. Furthermore, if the percent relaxation of the yarn is below 2%, the shrinkage of the yarn will be increased so that an excessive reduction in tenacity of the yarn in a shrinkage process after weaving will be caused. On the other hand, if the percent relaxation is above 7%, the excessive shaking of the yarn in a drawing process will be caused. By the low shrinkage property of the fiber produced according to the present invention, a grey fabric for airbags can be prevented from being heat-shrunk rapidly during its refining and drying processes, and thus, the quality of the fabric can be improved and a reduction in tenacity of the fabric can be minimized.

The low shrinkage polyamide fiber produced according to the method of the present invention has the following physical properties: (1) a dry-heat shrinkage of 3-6% (at 190° C. for 15 minutes), (2) a tenacity of at least 9.0 g/d; (3) an elongation of at least 20%; (4) a birefringence of less than 0.065; and (5) a fineness of 200-1000 deniers.

The low shrinkage polyamide fiber produced by the inventive method is woven in a plain weave configuration at typically 27-30 yarns/cm in all warp and weft yarns for 210 denier polyamide yarns, 16-22 yarns/cm in all warp and weft yarns for 420 denier polyamide yarns, and 13-18 yarns/cm in all warp and weft yarns for 630 denier polyamide yarns, using a Rapier loom or water-jet loom weaving machine, such that the low air permeability requirement is accomplished.

In weaving a fabric from the low shrinkage polyamide fiber produced by the inventive method, the fiber is preferably woven in a plain weave configuration having a symmetrical structure. Alternatively, in order to produce a charming fabric, a yarn having a lower linear density may also be woven into a 2/2-panama weave fabric of a symmetrical structure.

The uncoated fabric for airbags according to the present invention is preferably produced by a method comprising the following steps:

(A) weaving a low shrinkage polyamide fiber having a dry heat shrinkage of 3-6% (at 190° C. for 15 minutes) into a grey fabric for airbags;

(B) heat-shrinking the grey fabric by successively passing it through 3-10 aqueous baths, the temperature of each of which is 5-20° C. higher than that of the preceding aqueous bath;

(C) additionally heat-shrinking the fabric from the aqueous baths by passing it through a steam heater; and (D) drying the fabric from the steam heater by passing it through a hot air drier In the step (B) of the method for the production of the uncoated fabric for airbags of the present invention, it is preferred that the grey fabric for airbags is first passed through an aqueous bath of 50° C., and then successively passed through five aqueous baths, the temperature of each of which is 10° C. higher than that of the preceding aqueous bath.

In the step (C) of this method, the temperature of the steam heater is preferably 150-220° C.

In the step (D) of this method, the fabric inlet of the hot air drier preferably has a temperature of 140-160° C., and the temperature of the fabric outlet is about 30-70° C. higher than that of the fabric inlet.

The uncoated fabric for airbags produced by the inventive method has the following physical properties: a tensile strength of 200-300 kg, a tear strength of 25-40 kg, and a air permeability of less than 1.0 $cm^3/cm^2/sec$.

The method for the production of the uncoated fabric for airbags according to the present invention is characterized by the process wherein the fabric for airbags woven of the low shrinkage polyamide fiber having a dry heat shrinkage of 3-6% (at 190° C. for 15 minutes) is scoured and heat-shrunk in multi-stages in the steam heater and the hot air drier.

In the step (B) of the method for the production of the inventive airbag fabric, the grey fabric for airbags is first passed through the aqueous bath of 50° C. and then successively passed through 3-6 aqueous baths, the temperature of each of which is 10-20° C. higher than that of the preceding aqueous bath. At this time, the temperature of the final aqueous bath is 100° C.

Another characteristic of the method for the production of the inventive airbag fabric is that the heat-shrunk fabric is additionally heat-shrunk by passing through the steam heater of 150-220° C. after the scouring process. The reason why this additional heat shrinkage is performed is because it is difficult to ensure that the low shrinkage polyamide fiber produced according to the present invention has a sufficiently low permeability for airbags only by fabric shrinkage occurring in the scouring and drying processes. At this time, the heat shrinkage of the fabric in the steam heater is preferably about 10-40% relative to the entire fabric.

As described above, the present invention utilizes the low shrinkage polyamide fiber to produce the uncoated fabric for airbags, so that the quality of the fabric can be prevented from being lowered due to its rapid shrinkage in the hot air drier, and a reduction in tenacity of the fabric can be minimized.

The following Examples are given for the purpose of illustration only, and are not intended to limit the scope of the invention. The physical properties of yarns and fabrics produced in Examples and Comparative Examples were evaluated in the following manners.

(1) Relative Viscosity (R.V.)

0.1 g of a sample was dissolved in sulfuric acid (90%) for 90 minutes to a concentration of 0.4 g/100 ml. The solution was put in an Ubbelohde viscometer and kept in a 30° C. incubator for 10 minutes. The dropping time (sec) of the sample as well as that (sec) of the solvent were measured using a viscometer and an aspirator, and RV values were calculated based on the following formula:

$$RV = \text{dropping time (sec) of the sample/dropping time (sec) of the solvent} \quad (1)$$

(2) Strength and Elongation

A sample was kept under a standard atmosphere (20° C. and 65% relative humidity) for 24 hours and then its strength and elongation were measured in accordance with ASTM D 885 at a sample length of 250 mm, a tensile speed of 300 mm/min and 20 turns/m, using Instron 5565 (Instron Co., Ltd, USA).

(3) Boiling Water Shrinkage

A sample was kept under a standard atmosphere (20° C. and 65% relative humidity) for 24 hours and then its length ($L_0$) at 0.1 g/d load was measured. The sample was kept in 100° C. boiling water for 30 minutes under a non-tension condition, and left outdoors for 4 hours, and then its length (L) at 0.1 g/d load was measured. The shrinkage (%) of the sample was calculated from the following formula:

$$\Delta S(\%) = (L_0 - L)/L_0 \times 100$$

(4) Dry Heat Shrinkage

A sample was kept under a standard atmosphere (20° C. and 65% relative humidity) for 24 hours and then its length ($L_0$) at 0.1 g/d load was measured. The sample was kept in a 190° C. dry oven for 15 minutes under a non-tension condition, and left outdoors for 4 hours, and then its length (L) at 0.1 g/d load was measured. The shrinkage (%) of the sample was calculated from the following formula:

$$\Delta S(\%) = (L_0 - L)/L_0 \times 100$$

(5) Tensile Strength of Fabric

A fabric that is 10 cm wide and 15 cm long was kept under a standard atmosphere (20° C. and 65% relative humidity) for 24 hours, and then its tensile strength was measured in accordance with ASTM D 5034, using Instron 4465 (Instron Co., Ltd, USA).

(6) Tear Strength of Fabric

A fabric was kept under a standard atmosphere (20° C. and 65% relative humidity) for 24 hours, and then its tear strength was measured in accordance with ASTM D 2261 (tongue), using Instron 4465 (Instron Co., Ltd, USA).

(7) Air Permeability of Fabric

The air permeability of a fabric was measured in accordance with ASTM D 737 under a pressure of 125 Pa using a Frazier air permeability tester.

(8) Birefringence

The birefringence of a sample was measured using a polarizing microscope equipped with a Berek compensator.

EXAMPLE 1

A polyhexamethyleneadipamide polymer having a relative viscosity (R.V.) of 3.4 and containing copper metal at 40 ppm was melt-spun to a spinning draft ratio of 40 at 296° C. using an extruder. At this time, the residual time of the polymer in a spinning pack was 17 seconds, the L/D of the extender screw was adjusted to 35, and the melt-spun polymer was mixed uniformly in a static mixer with two mixing units, which had been disposed in the polymer-transporting pipe of the spinning pack. Then, the spun yarn was solidified by passing through a 600 mm-long cooling zone (open cooling chamber) where cooling air of 20° C. was blown at a rate of 0.6 m/sec. Then, the solidified yarn was oiled, and taken-up in a rate of 470 m/min, and then drawn in two stages. The first drawing was performed at 30° C. and a draw ratio of 3.5, and the second drawing was performed at 223° C. and a draw ratio of 1.6. Then, the drawn yarn was heat-set at 235° C., relaxed to 6% and wound to form a final drawn yarn having a fineness of 630d/136f.

The physical properties of the drawn yarn thus obtained were measured and the results are given in Table 1 below.

EXAMPLES 2~4 AND COMPARATIVE EXAMPLES 1~4

Drawn yarns were produced in the same manner as in Example 1 except that fineness, spinning temperature and drawing conditions were changed as shown in Table 1.

The physical properties of the drawn yarn thus obtained were measured and the results are given in Table 1 below.

TABLE 1

|  | | | | Condition of relaxation | | Drawn yarn | | | | |
| --- | --- | --- | --- | --- | --- | --- | --- | --- | --- | --- |
|  | Relative viscosity of chip | Spinning temperature (° C.) | Fitness | Relaxation Temperature (° C.) | Percent Relaxation (%) | Dry heat shrinkage (%) (190° C. × 15 min) | Boiling water shrinkage (%) | Tenacity | Elongation | Birefringence |
| Example 1 | 3.4 | 296 | 630d/136f | 235 | 6.0 | 5.2 | 5.1 | 9.3 | 25.8 | 0.061 |
| Example 2 | 3.4 | 296 | 630d/100f | 235 | 6.0 | 4.6 | 4.5 | 9.4 | 24.0 | 0.058 |

TABLE 1-continued

| | Relative viscosity of chip | Spinning temperature (° C.) | Fitness | Condition of relaxation | | Drawn yarn | | | | |
| --- | --- | --- | --- | --- | --- | --- | --- | --- | --- | --- |
| | | | | Relaxation Temperature (° C.) | Percent Relaxation (%) | Dry heat shrinkage (%) (190° C. × 15 min) | Boiling water shrinkage (%) | Tenacity | Elongation | Birefringence |
| Example 3 | 3.4 | 296 | 420d/68f | 235 | 6.0 | 4.4 | 4.3 | 9.5 | 24.6 | 0.059 |
| Example 4 | 3.4 | 296 | 420d/136f | 235 | 6.0 | 5.6 | 5.4 | 9.6 | 26.4 | 0.061 |
| Comparative Example 1 | 3.4 | 296 | 630d/136f | 225 | 2.5 | 7.1 | 7.0 | 9.1 | 23.8 | 0.066 |
| Comparative example 2 | 3.4 | 296 | 630d/100f | 225 | 2.5 | 6.8 | 6.7 | 9.2 | 22.1 | 0.067 |
| Comparative example 3 | 3.4 | 296 | 420d/68f | 225 | 2.5 | 6.4 | 6.3 | 9.2 | 22.6 | 0.068 |
| Comparative example 4 | 3.4 | 296 | 420d/136f | 225 | 2.5 | 7.2 | 7.1 | 9.6 | 24.4 | 0.067 |

EXAMPLE 5

The yarn produced in Example 1 was plain-woven with a Rapier weaving machine to a fabric of 41×41 per inch to produce a grey fabric for airbags. In a scouring process, the grey fabric was passed through an aqueous bath of 50° C., and then successively passed through five aqueous baths, the temperature of each of which is 10° C. higher than that of the preceding aqueous bath. At this time, the temperature of the final aqueous bath is 100° C. After the scouring process, the fabric was additionally heat-shrunk by passing through a steam heater of 180° C., and then dried in a hot air drier of 180° C.

The physical properties of the drawn yarn thus obtained were measured and the results are given in Table 2 below.

COMPARATIVE EXAMPLE 5

The yarn produced in Comparative example 1 was plain-woven with a Rapier weaving machine to a fabric of 41×41 per inch to produce a grey fabric for airbags. In a scouring process, the grey fabric was passed through an aqueous bath of 50° C., and then successively passed through five aqueous baths, the temperature of each of which is 10° C. higher than that of the preceding aqueous bath. At this time, the temperature of the final aqueous bath is 100° C. After the scouring process, the fabric was additionally heat-shrunk by passing through a steam heater of 190° C., and then dried in a hot air drier of 180° C.

The physical properties of the drawn yarn thus obtained were measured and the results are given in Table 2 below.

COMPARATIVE EXAMPLE 6

The yarn produced in Example 1 was plain-woven with a Rapier weaving machine to a fabric of 41×41 per inch to produce a grey fabric for airbags. The grey fabric was heat-shrunk rapidly by passing through an aqueous bath of 95° C., and then dried in a hot air drier of 180° C.

The physical properties of the drawn yarn thus obtained were measured and the results are given in Table 2 below.

COMPARATIVE EXAMPLE 7

The yarn produced in Example 1 was plain-woven with a Rapier weaving machine to a fabric of 41×41 per inch to produce a grey fabric for airbags. The grey fabric was heat-shrunk at 180° C. under the pressure of 483 kPa with Calindering apparatus to produce a drawn yarn.

The physical properties of the drawn yarn thus obtained were measured and the results are given in Table 2 below.

TABLE 2

| | Fitness of yarn | Density of fabric (strand/inch) | Tensile strength (kg) | Tear strength (kg) | Thickness (mm) | Air permeability (cm²/cm²/sec) | Weight (g/m²) |
| --- | --- | --- | --- | --- | --- | --- | --- |
| Example 5 | 630d/136f | 41 × 41 | 249 × 231 | 31.5 × 27.3 | 0.36 | 0.9 | 235 |
| Comparative example 5 | 630d/136f | 41 × 41 | 231 × 213 | 23.5 × 20.3 | 0.39 | 0.6 | 238 |
| Comparative example 6 | 630d/136f | 41 × 41 | 221 × 201 | 19.5 × 18.3 | 0.36 | 1.9 | 236 |
| Comparative example 7 | 630d/136f | 41 × 41 | 205 × 198 | 18.5 × 18.1 | 0.38 | 2.4 | 236 |

As described above, the present invention provides the uncoated fabric for airbags, which is produced by the method comprising the steps of:
(A) weaving a low shrinkage polyamide fiber having a dry heat shrinkage of 3-6% (at 190° C. for 15 minutes) into a grey fabric for airbags;
(B) heat-shrinking the grey fabric by successively passing it through 3-10 aqueous baths, the temperature of each of which is 5-20° C. higher than that of the preceding aqueous bath;

(C) additionally heat-shrinking the fabric from the aqueous baths by passing it through a steam heater; and (D) drying the fabric from the steam heater by passing it through a hot air drier.

Furthermore, according to the present invention, the grey fabric for airbags is produced using the low shrinkage polyamide fiber, which is obtained by controlling the drawn yarn to have a more stable crystalline structure and has a dry heat shrinkage of 3-6% (at 190° C. for 15 minutes). Thus, the present invention provides the uncoated fabric for airbags, which has high tensile strength and tear strength, and excellent quality.

What is claimed is:

1. A process for producing an uncoated fabric which comprises the steps of:
   (A) weaving a low shrinkage polyamide fiber into a grey fabric;
   (B) heat-shrinking the grey fabric by successively passing it through 3-10 aqueous baths, the temperature of each of which is 5-20° C. higher than that of the preceding aqueous bath;
   (C) additionally heat-shrinking the fabric from the aqueous baths by passing it through a steam heater; and
   (D) drying fabric from the stem heater by passing it through a hot air drier,
   wherein the temperature of the steam heater in the step (C) is 150-220° C.;
   wherein the uncoated fabric consists of polyamide fiber; and
   wherein the grey fabric is suitable for airbags.

2. The process of claim 1, wherein the grey fabric in the step (B) is first passed through an aqueous bath of 50° C. and then successively passed through 5 aqueous baths, the temperature of each of which is 10° C. higher than that of the preceding aqueous bath.

3. A process of claim 1, wherein the drying (D) is carried out using an air drier, and an inlet of the air drier has a temperature of 140-160° C., and the temperature of an outlet of the air drier is 30-70° C. higher than that of the inlet.

4. A process of claim 1, wherein the polyamide fiber in the step (A) has a dry heat shrinkage of 3-6% (at 190° C. for 15 minutes).

5. A process of claim 1, wherein the uncoated fabric has a tensile strength of 200-300 kg, a tear strength of 25-40 kg and an air permeability of less than 1.0 $cm^3/cm^2$/sec.

* * * * *